United States Patent Office 3,481,002
Patented Dec. 2, 1969

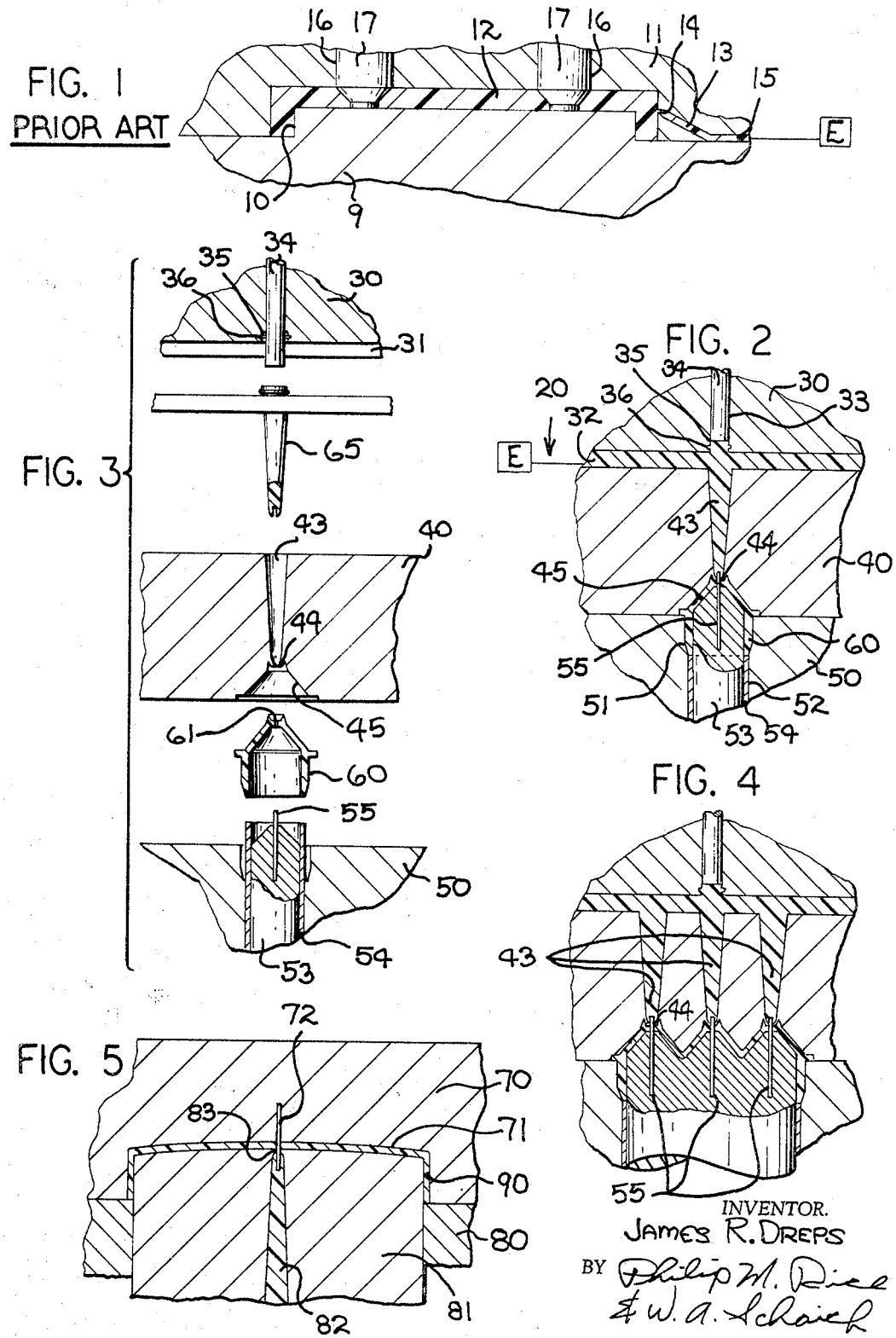

3,481,002
MOLDING APPARATUS
James R. Dreps, Kinnelon, N.J., assignor to Owens-Illinois, Inc., a corporation of Ohio
Filed Dec. 21, 1966, Ser. No. 603,647
Int. Cl. B29f 1/00
U.S. Cl. 18—42                                  7 Claims

ABSTRACT OF THE DISCLOSURE

Apparatus for injection molding plastic articles having at least one aperture therein. Heated thermoplastic material is introduced into the mold through an orifice positioned in alignment with the aperture of the molded article. A pin corresponding in size to the size of the desired aperture extends into the orifice.

BACKGROUND OF THE INVENTION

In the molding of plastic articles having apertures, it has been customary to provide on one of the molding members defining the molding cavity, insert pins corresponding in number to the number of apertures desired. When the molding members are closed, these pins extend across the cavity and contact the other molding member. Heated themoplastic material introduced into the cavity flows around the pins to form the article with the pins forming the apertures. It is critical, when molding apertures in this way, that the pins firmly abut the second molding member in order to prevent heated thermoplastic material from flowing between the pins and the molding surface thereby causing flash which may restrict or close the aperture. In order to insure against such flash, it is necessary that the pins engage the molding surface with a high pressure or force. While this method of forming apertures is satisfactory where the size of the apertures, and thus the size of the insert pins, are reasonably large, difficulty has been encountered in attempting to mold parts having small apertures in this manner. Without limiting the scope of the present invention, the difficulty arises in attempting to mold articles having apertures of 0.040 inch or smaller. The reason for the difficulty is that the pins used for forming apertures of such small size are of equally small size and are susceptible to damage upon closing of the mold halves. As a result, much time and expense is lost in replacing bent pins.

In view of the aforenoted difficulty, it has been the practice in the past when apertures of 0.040 inch or less were desired in an article to broach or drill such apertures in a separate operation after the molding operation. Such separate broaching operation obviously increases the cost of manufacturing the article.

The present invention is intended to overcome in an economical manner the difficulties encountered in molding plastic articles having small apertures and, therefore, has as its primary object, to provide an apparatus for injection molding articles having at least one aperture therein during the molding operation.

SUMMARY OF THE INVENTION

Under the present invention, it is proposed to mold plastic articles having apertures therein by providing on one of the mold portions defining the molding cavity an orifice or gate through which heated thermoplastic material may be introduced from a sprue and runner channel system into the cavity. The other portion of the molding apparatus defining the molding cavity is provided with an insert pin corresponding to the size of the desired aperture which, when the mold portions are closed, extends into the orifice or gate joining the molding cavity to the sprue channel. The insert pin is only a few thousandths of an inch smaller than the gate opening. Accordingly, when the molding apparatus is opened, the newly molded article will readily separate from waste material in the sprue channel.

Other objects and advantages of this invention will become apparent from the following detailed description taken in conjunction with the annexed sheet of drawings on which:

FIGURE 1 is a sectional view showing prior art apparatus for molding plastic articles with apertures.

FIGURE 2 is a sectional view of the mold of the present invention showing the mold plates in a closed position.

FIGURE 3 is a view similar to FIGURE 2 showing the mold plates in an open position and the finished part ejected therefrom.

FIGURE 4 is a sectional view showing a modified embodiment of the present invention.

FIGURE 5 is a sectional view showing another embodiment.

Referring now to the drawings, there is illustrated in FIGURE 1 apparatus for forming articles having apertures according to prior art teachings. Such apparatus typically includes a plate 9 having a force plug 10 positioned thereon cooperating with a cavity plate 11 to define a molding cavity 12 conforming to the configuration of the article to be formed. The cavity plate 11 includes a passage or sprue 13 having a restricted orifice or gate 14 communicating with the molding caivty 12 through which heated thermoplastic material such as polyethylene, polypropylene, or other moldable plastic material may be introduced under pressure. As is well known in the art of injection molding, the heated thermoplastic material is distributed from an extruder E by a series of runners 15, one of which is shown in FIGURE 1.

The cavity plate 11 has a plurality of bores 16, each of which has secured therein a pin 17. The ends of the pins span the molding cavity when the plates 9 and 11 are closed and have a size and configuration corresponding to that of the apertures to be formed. The plate 9 carrying the force plug 10 and cavity plate 11 are axially movable (up and down in FIGURE 1) relative to one another between an open position (not shown) and a closed position (FIGURE 1). When the plates are in the closed or molding position, the pins 17 engage the molding surface of the force plug 10 very firmly to prevent thermoplastic material from flashing between the ends of such pins and the molding surface of the force plug 10. While pins for relatively large apertures can withstand such force, pins for small apertures (generally 0.040 inch or less) simply do not possess sufficient strength to withstand such force without deforming.

Referring now to FIGURES 2 and 3 for a description of the present invention, there is provided a mold designated generally by the numeral 20 comprising a plurality of plates 30, 40 and 50. The plate 30 is provided with a recessed area 31 which cooperates with the face of the plate 40 to form an enclosed passageway or channel 32 through which heated thermoplastic material may be introduced from an extruder E when the plates 30 and 40 are in closed or abutting position. In the injection molding art, the channel 32 is known as a runner.

The plate 30 has an aperture 33 in which is slidably positioned an ejector pin 34. The aperture 33 terminates adjacent the runner 32 in an enlarged area 35 having a reentrant portion 36. As will be described in greater detail, the introduction of heated thermoplastic material under injection pressures will cause such material to flow into all cavities including reentrant portion 36. Upon setting of such material and opening of the plates, the plastic material in the reentrant portion 36 will be retained therein and move with the plate 30 as it opens. Subsequently, such material may be ejected by the ejector pin 34.

The plate 40 is provided with a passage or sprue channel 43. The sprue terminates in a restricted orifice or gate 44. Beyond the gate 44 is a female molding cavity 45 facing the plate 50.

The plate 50 is provided with a recessed area 51 which cooperates with the cavity 45 to define the external surface of the article to be molded. The plate 50 also has a bore 52 in which is positioned a force plug 53. The force plug 53 is contoured at its free end and cooperates with the recess 51 and the cavity 45 to define a molding chamber having a configuration corresponding to that of the desired article to be formed. Such article is identified by the numeral 60 and has an aperture 61 therein. Telescoping about the force plug 53 is an ejector sleeve 54 which serves to form the end portion of the article 60 and which is axially movable relative to the force plug 53 to eject the formed article from the force plug (see FIGURE 3).

Secured to the free end of the force plug 53 is a pin 55 corresponding in size to the aperture 61 desired to be formed in the article 60. The gate opening 44 is so sized relative to the size of the pin 55 that only a very small gap, on the order of 0.004 to 0.007 inch, will be provided for the introduction of heated thermoplastic material from the sprue channel 43. Thus, assuming an aperture of 0.040 inch is desired, the pin 55 will be 0.040 inch in diameter and the gate 44 will be approximately 0.048 to 0.054 inch in diameter.

In operation, the plates 30, 40 and 50 are clamped together to the position illustrated in FIGURE 2 by any conventional injection molding apparatus. In such position, the pin 55 extends through the gate 44 and into the sprue channel 43. Heated thermoplastic material is then introduced from a conventional source, through the runner 32 down through the sprue channel 43 around the pin 55 and through the gap between the gate 44 and the pin 55 completely filling the molding cavity to form the desired article 60 having the aperture 61 therein.

Upon cooling and setting of the thermoplastic material, the plates 30, 40 and 50 are opened. Such opening movement causes the material in the runner 32 and sprue channel 43 to be severed from the article 60. The separation is affected by a tearing action of the thin web of plastic material in the gate 44 around the pin 55. The article 60 is intitially retained on the force plug 53 by friction until it is at a position completely free of the cavity 45 of plate 40. Then, the ejector sleeve 54 is moved forward to the position shown in FIGURE 3 to strip the article 60 from the force plug 53 and pin 55 permitting such article to drop to a collecting device (not shown). The waste material 65 is pulled from the sprue channel 43 by virtue of being retained in the reentrant portion 36 of the plate 30. After such waste material 65 is completely out of the sprue channel 43, the ejector pin 34 is moved to the position illustrated in FIGURE 3 to strip such waste material from the reentrant portion 36 permitting it to fall free.

Referring now to FIGURE 4, there is provided a modification wherein a plurality of apertures may be formed. This modification is the same as the first embodiment except that a plurality of pins 55 are provided and a gate 44 and sprue channel 43 are provided for each of the pins 55. The number of pins 55, gates 44 and sprue channels 43 correspond to the number of apertures 61 desired in the article 60.

Referring now to FIGURE 5, there is illustrated a further embodiment wherein the heated thermoplastic material is introduced through the force plug rather than through the female side of the molding cavity. In this embodiment, there is provided a pair of plates 70 and 80. The plate 70 has a cavity 71 corresponding to the desired exterior configuration of the article 90 to be formed. Retained on the plate 70 is a pin 72 corresponding in size to the size of the aperture desired in the article 90.

Cooperating with the plate 80 is a force plug 81, the end of which extends into cavity 71 and cooperates therewith to form a molding chamber in which the article 90 is molded. The force plug 81 has a sprue channel 82 terminating in a gate 83 through which plastic material is introduced to the molding chamber. The pin 72 extends into the gate 83 as in the previous embodiment.

The operation of this embodiment is essentially the same as the previous embodiment. Upon completion of the molding step, the plates 70 and 80 are opened with the article 90 being retained on the force plug 81. Thereafter, the plate 80 and force plug 81 are moved relative to one another in a direction which causes the plate 80 to strip the article 90 from the force plug 81. Such movement severs the article from the waste material in the sprue channel 82.

It can be readily seen from the foregoing that the present invention provides an economical means of forming plastic articles having small apertures. While the foregoing description refers primarily to using the apparatus of the present invention for molding thermoplastic materials, it should be understood that it can be used for molding any material capable of being injection molded, including thermosetting materials.

Numerous modifications will be readily apparent to those skilled in the art. Accordingly, the present invention is intended to be limited only by the scope of the appended claims.

I claim:

1. Apparatus for molding a plastic article having at least one aperture therein comprising first and second mold means cooperating when closed to define a molding cavity conforming to the configuration of the desired article, an orifice in one of said mold means for introducing material to be molded into said molding cavity, an insert pin positioned on the other of said mold means and having an end extending into said orifice to a point beyond the molding cavity when said mold means are closed, and means for introducing material to be molded into said molding cavity.

2. Apparatus for molding a plastic article having at least one aperture therein comprising first and second mold plates, one of said plates having a cavity conforming to the configuation of the exterior surface of at least a part of the desired article, the other of said plates having a force plug positionable in said cavity and cooperating with said one plate to define a molding chamber, a pin on said force plug corresponding in size to the size of the aperture desired, orifice means in said one plate for introducing material to be molded into said molding chamber, said pin having an end extending into said orifice means to a point beyond the molding chamber when said force plug and said plates are in a closed position defining said molding chamber, means for introducing material to be molded through said orifice means and around said pin to form the article.

3. The apparatus as defined in claim 2 wherein said pin is no greater than .040 inch and said orifice means is no greater than .054 inch.

4. Apparatus for molding a plastic article having at least one aperture therein comprising first and second mold plates, one of said plates having a cavity conforming to the configuration of the exterior surface of at least a part of the desired article, the other of said plates having a force plug positionable in said cavity and cooperating with said one plate to define a molding chamber, a pin on said first plate corresponding in size to the size of the aperture desired, orifice means in said force plug for introducing material to be molded into said molding chamber, said pin having an end extending across said molding chamber and into said orifice means to a point beyond said molding chamber when said force plug and said plates are in a closed position defining said molding chamber, and means for introducing material to be molded through said orifice means and around said pin to form the article.

5. The apparatus as defined in claim 4 wherein said pin is no greater than .040 inch and said orifice means is no greater than .054 inch.

6. Apparatus for molding a plastic article having at least one aperture therein comprising first and second mold plates, one of said plates having a cavity conforming to the configuration of the exterior surface of at least a part of the desired article, the other of said plates having a force plug positionable in said cavity and cooperating with said one plate to define a molding chamber, a pin on one of the members consisting of said force plug and said one plate, said pin corresponding in size to the size of the aperture desired, orifice means in the other of said members for introducing material to be molded into said molding chamber, said pin having an end extending into said orifice means to a point beyond said molding chamber when said force plug and said plates are in a closed position defining said molding chamber, means for introducing material to be molded through said orifice means and around said pin to form said article.

7. The apparatus as defined in claim 6 wherein a plurality of said pins are positioned on said one member, and a plurality of orifice means are in said other member, said plurality corresponding in number to the number of apertures desired, each of said orifice means having a single pin positioned therein when said plates are in a closed position.

References Cited

UNITED STATES PATENTS

| | | |
|---|---|---|
| 2,357,950 | 9/1944 | Goessling. |
| 2,808,620 | 10/1957 | Schmid et al. |
| 2,999,273 | 9/1961 | Gronemeyer et al. |
| 3,013,308 | 12/1961 | Armour. |
| 3,344,942 | 10/1967 | Hedgewick. |

FOREIGN PATENTS 962,726  12/1949  France.

J. HOWARD FLINT, JR., Primary Examiner

U.S. Cl. X.R.

18—30